2,787,547

Patented Apr. 2, 1957

2,787,547

METHOD OF CLARIFYING WHISKEY

Max G. Boraks, Newton, Mass., assignor to Mr. Boston Distiller Inc., Boston, Mass., a corporation of Massachusetts No Drawing. Application December 23, 1954, Serial No. 477,420

3 Claims. (Cl. 99—48)

This invention relates to a method of clarifying whiskey stored in barrels, and the principal purpose of the invention is to provide a relatively inexpensive and efficient method to remove any rancid oils and congeneric mold growths which tend to impart a musty flavor, without removing the desirable flavors or affecting the desirable color of the whiskey.

It is well known that barreled rye or corn whiskeys sometimes develop mold growths because some of the grain, corn or oil employed in distillation contained undiscoverable sports or fungi which pass through the still and ultimately impair the flavor of the whiskey. So far as I am aware, no satisfactory means or method has heretofore been devised for removing the objectionable musty flavor and aroma, while retaining the color of the whiskey and restoring its desired flavor.

I have discovered that this result is satisfactorily achieved by a novel method which preferably involves the following procedures:

Pouring the barreled, musty whiskey (at a proof higher than 100) into a tank, and reducing the alcoholic content to 80-90 proof (the proof at which the whiskey is to be bottled) by adding distilled water;

Heating the contents of the tank to 100°-110° F. by means of any suitable source of heat;

Adding to the heated contents an homogenized, hydrogenated vegetable oil, and briskly agitating the mixture, within the aforesaid temperature range, for at least one hour, to cause the added vegetable oil to mix and combine with other oils contained in the whiskey and having the objectionable characteristics which are to be removed. The added vegetable oil may be a commercial oil of commerce, primarily used as a shortening, which contains an emulsifying agent and is thus miscible with the whiskey and remains in suspension until congealed;

Cooling the contents of the tank or vat, by suitable refrigerating means, to a temperature of 16°-18° F., and maintaining that temperature for at least fifteen hours, so that the oil congeals and rises to the surface of the clarified whiskey; and Then, draining the chilled, clarified whiskey from the vat, and filtering it to remove any solids; the crust of congealed oil (with the entrained impurities) left in the vat, being discarded.

It has been found that the drained and filtered whiskey is free of any undesirable musty or rancid flavor or odor, with its desired color retained and flavor restored, and without cloudiness or other objectionable characteristics. The process recovers practically all of the whiskey poured into the vat. The clarified whiskey, at the desired proof, may then be replaced in clean barrels, or bottled for sale.

I claim:

1. A method of clarifying whiskey previously stored in barrels, comprising the steps of placing the whiskey, at bottling proof, in a tank and heating it to a temperature above 100° F.; adding to the heated whiskey an homogenized, hydrogenated vegetable oil and agitating the mixture, so that the oil entrains rancid oils and congeneric mold growths; cooling the mixture to a temperature below 20° F. and maintaining such temperature for a substantial time period, so that the added oil with entrained impurities congeals and rises to the surface; and then draining the clarified whiskey from the tank.

2. A method of clarifying whiskey as described in claim 1, in which the mixture is agitated vigorously for at least one hour, and the temperature after cooling is between 16° and 18° F. and is maintained for at least fifteen hours.

3. A method of clarifying whiskey as described in claim 2, in which the draining of the whiskey from the tank is performed while the whiskey is chilled and leaves the congealed oil as a crust in the tank, and the clarified whiskey is filtered to remove solids or congealed particles.

References Cited in the file of this patent

UNITED STATES PATENTS

| | | |
|---|---|---|
| 2,234 | Webb | Aug. 28, 1841 |
| 92,640 | Parsons | July 13, 1869 |
| 273,604 | Ralu | Mar. 6, 1883 |